Dec. 30, 1958  W. R. GROVES  2,866,561
LOADING DEVICES FOR MOULDING PRESSES
Filed April 5, 1954  2 Sheets-Sheet 1
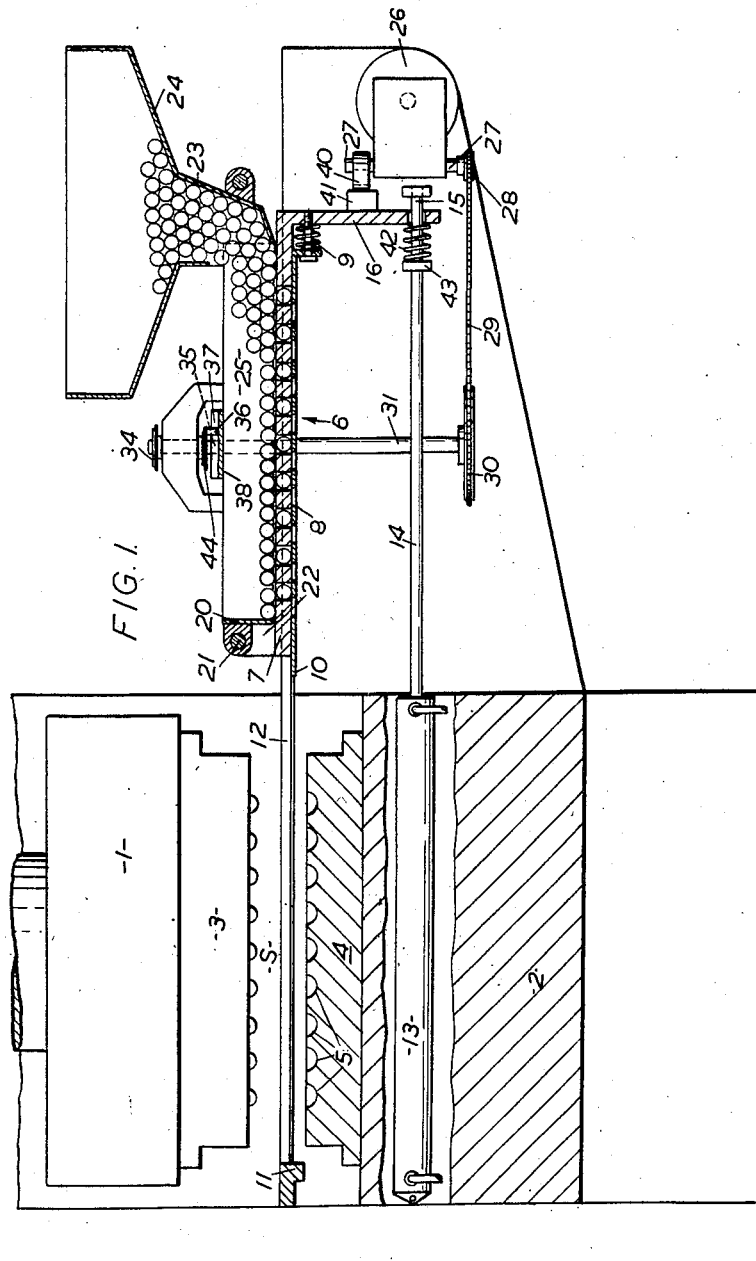
FIG. I.
Inventor:
Walter Robert Groves
By: Baldwin & Wight
Attorneys

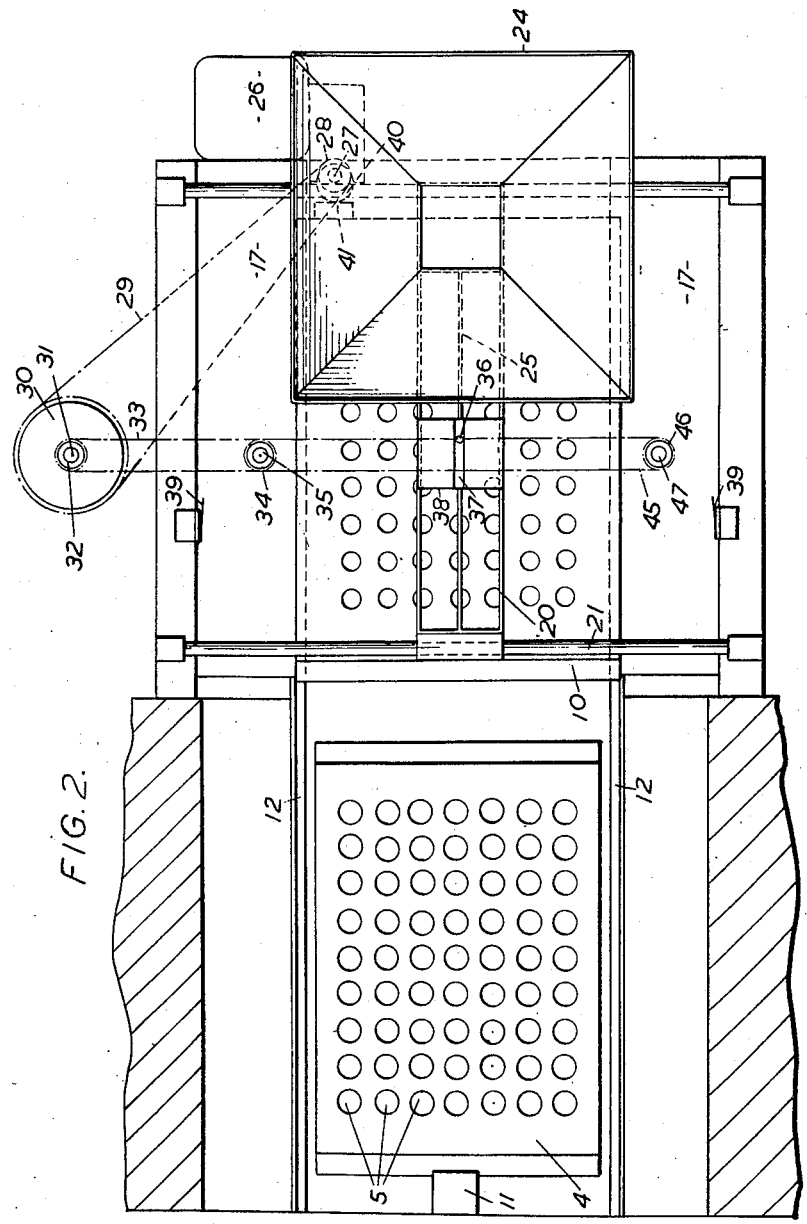

United States Patent Office 2,866,561
Patented Dec. 30, 1958

2,866,561

LOADING DEVICES FOR MOULDING PRESSES

Walter Robert Groves, Wolverhampton, England, assignor to British Industrial Plastics Limited, London, England, a company of Great Britain Application April 5, 1954, Serial No. 421,084

Claims priority, application Great Britain April 8, 1953

5 Claims. (Cl. 214—1)

This invention comprises improvements in connection with devices for loading pre-formed pellets of moulding composition into the mould cavities of multiple cavity moulding presses, said loading devices being of the type comprising a carriage adapted to run into and out of the space between the press platens and carrying an apertured tray underneath which is an apertured shutter, the apertures of which are normally out of register with those of the tray. When the carriage is outside the press, pellets are charged into the apertures of the tray, and when the carriage is inside the press the shutter is positioned and the tray is automatically moved with respect thereto so that the apertures of the tray and shutter are in register with one another and with the mould cavities. Thus the pellets drop into the mould cavities and thereupon the carriage is retracted for recharging whilst the press platens are brought together to perform the moulding operation. There are several rows of mould cavities and a corresponding number of rows of apertures in the tray and shutter.

The shutter may be spring-biased and may be automatically moved by causing it to encounter an abutment when its apertures are in register with the mould cavities so that the shutter is halted whilst the carriage with the tray completes the short distance of its further inward travel which will bring the apertures of the tray into register with those of the shutter.

The object of the present invention is to provide a simple and effective means for automatically charging the apertures of the tray of the loading device.

This object is achieved by a charging means comprising an open-bottom trough-like pellet dispenser shaped to span one dimension of the apertured tray and a part of the other dimension, means for moving the dispenser so that whilst spanning the first dimension it will sweep over the other dimension, and means for feeding pellets into the dispenser and keeping it supplied as it moves and dispenses pellets into the apertures of the tray. Preferably the bottom edges of the dispenser just clear the top of the tray and the latter is jogged or oscillated during the charging operation. Such jogging or oscillation ensures complete charging, minimizes jamming and distributes the feed throughout the dispenser.

The dispenser may be supplied with pellets through an open end thereof from a chute or throat, which may be adjustable, at the bottom of a hopper which partakes of the movement of the dispenser. The arrangement is such that the feed is insufficient to cause pellets to spill out of the open top of the dispenser, which is of limited depth, but sufficient to ensure that at least one layer of pellets is maintained at all times over the length of the dispenser. If desired, the dispenser may be thus supplied through both ends.

The width of the dispenser is preferably such that it spans a few only, say two or three, of the rows of apertures in the tray. There may be a longitudinal partition in the dispenser so that the advancing side of the partition is primarily dispensing pellets while the trailing side is mainly receiving pellets from the supply. During the next traverse in the opposite direction for the next charge the roles of the two sides of the partition will be reversed.

The sweep of the dispenser is preferably over the dimension of the tray, which is rectangular, at right-angles to its movement into and out of the press. The charging station may accordingly be furnished with side platforms between which the tray will stand in its outside position and upon which, respectively, the dispenser will stay between its traverses.

The reciprocating movement of the dispenser and its associated parts, slidably mounted on guides may be effected by a motor operating through suitable gearing and linkage, e. g. a pin on an endless chain engaging in a slot, transverse to the runs of the chain, in a bridge-piece carried by the dispenser. The motor may be automatically stopped each time the dispenser reaches the end of a traverse. The same motor, operating a cam, is preferably used to jog or oscillate the tray against a biassing spring during charging.

The tray may be mounted on slides and moved thereon by pneumatic means such as air jacks coupled, if desired, with like means operating mechanism for stripping the mould cavities at the end of a moulding operation.

To complete the automaticity the motor actuating the dispenser may be started by a switch operated by the press ram when the press closes.

One embodiment of the invention is described, by way of example, in the accompanying drawings in which:

Figure 1 is an elevation, partly in section, of the charging means and its associated moulding press, showing the loading device at its loading station outside the press, with the apertures in the tray filled with pellets, and Figure 2 is a plan view of Figure 1 with the upper part of the moulding press removed, so as to show the lower part.

Referring to the drawings, 1 and 2 are the upper and lower platens respectively of a multiple cavity moulding press of known type carrying respectively upper and lower moulds 3 and 4. The lower mould is formed with a multiplicity of mould cavities 5 which, when the press is open, as shown in Figure 1, are each filled with a preformed pellet of moulding composition by means of a reciprocable or oscillatable loading device of known type comprising a carriage generally indicated at 6 adapted to run into and out of the space S between the moulds of the press (known as and hereinafter referred to as the press "daylight") and formed by an apertured tray 7 carrying underneath it a slidably mounted apertured shutter plate 8 whose apertures are normally maintained out of register with those of the tray.

When the loading device is outside the press at its loading station, the apertures of the tray are charged with pellets, and when the device is inside the press in the "daylight" the shutter plate is positioned and the tray is moved with respect thereto so that the apertures of the tray and shutter plate become in register with one another and with the mould cavities 5. The pellets within the apertures of the tray drop into the said cavities and, thereupon, the device is retracted to its loading station again for recharging whilst the press platens are moved to bring the moulds together to perform the moulding operation.

The shutter plate 8 is biassed by a spring 9 to project beyond the tray 7 in the direction of its inward journey to the press as indicated at 10 so that it encounters an abutment 11 at the far side of the press when its apertures are in register with the mould cavities 5 and is halted in this position whilst the tray 7 completes the short distance of its further inward travel, compressing the spring 9, to bring its apertures containing the pellets into register with those of the shutter and the mould cavities 5.

The tray 7 is slidably mounted on guides 12 secured on either side of the press "daylight" and is moved thereon by pneumatic means comprising an air jack 13, the piston rod 14 of which is connected by a loose coupling indicated at 15 (the use of which is described hereinafter) to a bracket 16 formed on the tray 7. When the loading device is outside the press at its charging station it slides between platforms 17 formed on either side and arranged to be level with the top of the tray 7.

The pellet charging means for the apertured tray comprises an open-bottom rectangular trough 20 reciprocably or oscillatably slidably mounted on transverse guides 21 fixedly secured at 22 to the frame-work by which the loading device is mounted on the press, so as to be capable of movement across the tray 7 and side platforms 17 in a direction at right-angles to the direction of movement of the tray and associated shutter plate 8 into and out of the press "daylight."

The trough is of limited depth and is long enough to span completely the length of the tray 7 but is only wide enough to span a part of the width of the tray, such part being two or three rows of apertures as shown in Figure 2. The trough is supported on its guides 21 so that its bottom edges are just clear of the surfaces of the platforms 17 and the tray 7 so that, in effect, the said surfaces form a bottom for the trough as it moves over them.

The trough 20 is supplied with pellets of moulding composition through one end thereof (the right hand end of Figure 1) which is open and connected to the lower end of a throat 23 the upper end of which is in turn connected to the bottom of a hopper 24 adapted to contain a supply of pellets. The throat and hopper partake of the movement of the trough in its sweep across the tray 7. With this arrangement the feed of pellets through the throat into the trough is insufficient to cause the trough to become over-filled and for pellets to spill out of its open top, but is sufficient to ensure that at all times at least one layer of pellets is maintained over the entire length of the trough 20.

The throat passage is large enough to pass the largest size of pellets which may be used in the moulding operation and, therefore, it may be desirable to make the throat passage adjustable in size so that when using smaller sized pellets the flow through the throat passage may be controlled. Such an adjustment of the throat passage is not shown but may take any known form of throttling means.

The trough 20 is provided with a longitudinal partition 25 extending the full depth of the trough and dividing the width of the trough into two equal compartments, both of which are in communication with the throat passage whereby as the trough moves over the tray 7 the advancing side of the partition will be primarily dispensing pellets into the rows of apertures while the trailing side will be mainly receiving pellets from the supply. On the next traverse of the trough in the opposite direction for recharging the apertured tray, the roles of the two sides of the partition will be reversed. Such an arrangement ensures that there is always an adequate supply of pellets in the trough for dispensing during any one traverse.

The reciprocating movement of the trough and its associated hopper and connecting throat is effected by an electric motor 26 through a chain drive employing reduction gearing so as to slow down the speed of movement of the trough. A suitable speed of movement is one complete traverse in 20 seconds. The electric motor 26 drives a vertical shaft 27 having at its lower end a toothed pulley wheel 28 coupled by an endless chain 29 to a larger toothed pulley wheel 30 carried by the lower end of a vertical shaft 31 rotatably mounted on one side of the loading device frame-work. The shaft 31 carries at its upper end a smaller toothed pulley wheel 32 (see Figure 2) which is coupled by an endless chain 33 to a toothed pulley wheel 34 of similar size to the pulley wheel 32, and carried on the upper end of a vertical shaft 35 rotatably mounted on the same side of the said loading device frame-work. The lower end of the shaft 35 carries a toothed pulley wheel 44 which is coupled by an endless chain 45 to a toothed pulley wheel 46 carried by a shaft 47 rotatably mounted on the other side of the said loading device frame-work. The chain 45 carries a pin 36 which engages in a slot 37, transverse to the runs of the chain, formed in a bridge-piece 38 secured to the top of the trough, whereby movement of the chain 45 and pin 36 is transmitted to the trough.

Movement of the moulding press to close the moulds automatically starts the electric motor 26, the motor being stopped at the end of a traverse of the trough in either direction by the trough operating electrical switches 39 situated one on either side of the platforms 17 at the limit of the trough traverse.

In order to ensure complete charging of the tray 7, and to minimize jamming of the trough in its sweep across the tray by pellets which may be caught between the advancing edge of the trough whilst not completely in their apertures, the tray is jogged or oscillated during the traversing of the trough in charging operation. The mechanism for effecting this jogging or oscillating comprises a cam 40 carried by the vertical shaft 27 and engaging an abutment 41 on the bracket 16. As the shaft 27 rotates to drive the chains 29, 33 and 45 of the trough reciprocating mechanism, the rotating cam 40 moves the tray 7 to the left in the drawings, the tray being returned to the right and maintained in contact with the cam by a spring 42 carried on the piston rod 14 of the air jack 13 and acting between the bracket 16 and a collar 43 formed on the piston rod 14. The loose coupling 15, hereinbefore mentioned, permits the oscillating movement of the bracket 16. The frequency of oscillation of the tray 7 is much greater than the speed of reciprocation of the trough in its traversing movement so that pellets entering the apertures in the tray 7 from the traversing dispensing trough will have completely entered the apertures before the edge of the trough advances over them.

I claim:

1. Apparatus for charging, with pre-formed pellets of moulding composition, the apertures of an oscillatable apertured mould loading tray, comprising a trough-like pellet dispenser having an outlet at the bottom and shaped to span one area dimension of the apertured tray in the direction of oscillation of said tray and only a part of the other area dimension transverse to the direction of oscillation of said tray, means for moving the dispenser back-and-forth transversely to the direction of oscillation of said tray so that whilst spanning the first said dimension it will sweep over the other said dimension, means other than said tray and with respect to which said tray is oscillatable for preventing discharge of pellets from said outlet at the end of a sweep, and means for feeding pellets into said dispenser and keeping it supplied as it moves across the said other dimension and dispenses pellets into the apertures of the said tray.

2. Apparatus according to claim 1 including means supporting said dispenser above said tray so that the bottom edges of the dispenser just clear the top surface of said apertured tray.

3. Apparatus for charging, with pre-formed pellets of moulding composition, the apertures of an oscillatable apertured mould loading tray, comprising a trough-like pellet dispenser having an open-bottom and shaped to span one area dimension of the apertured tray in the direction of oscillation of said tray and only a part of the other area dimension transverse to the direction of oscillation of said tray, means for moving the dispenser back-and-forth transversely to the direction of oscillation of said tray so that whilst spanning the first said dimension it will sweep over the other said dimension, means other than said tray and with respect to which said tray is oscillatable for preventing discharge of pellets from said outlet at the end of a sweep, means for feeding pellets into said dispenser and keeping it supplied as it moves across the said other dimension and dispenses pellets into the apertures of the said tray, said feeding means comprising a throat having upper and lower ends, said lower end being connected to one end of said dispenser, and a supply hopper connected to the upper end of said throat, the throat and said supply hopper partaking of the movement of the dispenser.

4. Apparatus according to claim 1 characterised in that said dispenser is formed with a longitudinal partition dividing said dispenser, according to its direction of movement, into an advancing side and a trailing side, the said partition serving to cause pellets to be primarily dispensed from said advancing side while said trailing side is mainly being filled with pellets.

5. In an apparatus for charging with pre-formed pellets of moulding composition, the pellet receiving openings of a reciprocatory mould loading tray, the combination of pellet dispensing means for filling the openings of said tray comprising a trough having an open-bottom and shaped to span one area dimension of said tray in the direction of reciprocation of said tray and only a part of the other area dimension transverse to the direction of reciprocation of said tray, means for reciprocating said trough across the unspanned part of the tray to dispense pellets into the openings of said tray; and means adjacent to said tray and with respect to which said tray is reciprocable for preventing the escape of pellets from said trough when said trough has completed a traverse of the tray in either direction of its reciprocating movement across said tray.

References Cited in the file of this patent
UNITED STATES PATENTS

| | | |
|---|---|---|
| 747,422 | Helm | Dec. 22, 1903 |
| 2,394,260 | Pfeilsticker | Feb. 5, 1946 |
| 2,409,725 | Whitmore et al. | Oct. 22, 1946 |
| 2,457,220 | Fowler et al. | Dec. 28, 1948 |
| 2,706,072 | Furno | Apr. 12, 1955 |